(12) United States Patent
Dong et al.

(10) Patent No.: US 12,670,470 B2
(45) Date of Patent: Jun. 30, 2026

(54) REPLENISHMENT QUANTITY DETERMINATION METHOD AND APPARATUS, DEVICE, STORAGE MEDIUM, AND PROGRAM PRODUCT

(71) Applicant: Beijing Jingdong Zhenshi Information Technology Co., Ltd., Beijing (CN)

(72) Inventors: Hongyu Dong, Beijing (CN); Jingjing Tang, Beijing (CN); Xiaotian Zhuang, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 132 days.

(21) Appl. No.: 18/574,351

(22) PCT Filed: May 23, 2022

(86) PCT No.: PCT/CN2022/094513
§ 371 (c)(1),
(2) Date: Dec. 27, 2023

(87) PCT Pub. No.: WO2023/273696
PCT Pub. Date: Jan. 5, 2023

(65) Prior Publication Data
US 2024/0185179 A1 Jun. 6, 2024

(30) Foreign Application Priority Data

Jun. 30, 2021 (CN) .......................... 202110739879.1

(51) Int. Cl.
*G06Q 90/00* (2006.01)
*G06Q 10/087* (2023.01)

(52) U.S. Cl.
CPC ........... *G06Q 10/087* (2013.01); *G06Q 90/00* (2013.01)

(58) Field of Classification Search
None
See application file for complete search history.

(56) References Cited

U.S. PATENT DOCUMENTS 7,376,600 B1 * 5/2008 Wadawadigi ...... G06Q 30/0601
705/26.81
11,279,559 B1 * 3/2022 Montgomery ..... G06Q 10/0875
(Continued)

FOREIGN PATENT DOCUMENTS

CN 103268538 A 8/2013
CN 107194636 A 9/2017
(Continued)

OTHER PUBLICATIONS

International Search Report dated Jul. 18, 2022 of International Application No. PCT/CN2022/094513.
(Continued)

*Primary Examiner* — William J Jacob
(74) *Attorney, Agent, or Firm* — Qinghong Xu

(57) ABSTRACT

A replenishment quantity determination method and apparatus, a device, a storage medium, and a program product are provided. The method comprises: obtaining the inventory information of a warehouse and the product information of a product stored in the warehouse, and determining a target product; determining a total inventory quantity according to a substitution chain to which the target product belongs; determining a target inventory quantity and an inventory lower limit value according to the product information; if the total inventory quantity is less than the inventory lower limit value, and the inventory usage form of each product in the substitution chain comprises a bidirectional usage relationship, determining a replenishment ratio of the product; and according to each replenishment ratio, the target inventory quantity, and the total inventory quantity, determining the
(Continued)

Obtaining inventory information of a warehouse and product information of products stored in the warehouse, and determining a target product based on the inventory information and the product information — 201

Determining the total inventory based on the substitution chain to which the target product belongs, where the substitution chain includes a plurality of products and relationships between the products — 202

Determining a target inventory and an inventory lower limit value based on the information of products included in the substitution chain — 203

If the total inventory is less than the inventory lower limit value and the inventory usage forms of respective products in the substitution chain include bidirectional usage relationships, then determining the replenishment proportions of products with bidirectional inventory usage relationships in the substitution chain — 204

Determining the replenishment quantity for each product in the substitution chain with the bidirectional inventory usage relationship based on the replenishment proportions, target inventory, and total inventory — 205 replenishment quantity of each product having the bidirectional inventory usage relationship in the substitution chain.

14 Claims, 8 Drawing Sheets

(56) References Cited

U.S. PATENT DOCUMENTS

| | | | | |
|---|---|---|---|---|
| 2002/0116301 | A1* | 8/2002 | Chapman | G06Q 10/0875 705/26.1 |
| 2005/0256787 | A1 | 11/2005 | Wadawadigi et al. | |
| 2007/0106412 | A1 | 5/2007 | Esau | |
| 2007/0150332 | A1* | 6/2007 | Grichnik | G06Q 10/06375 705/7.12 |
| 2011/0145030 | A1 | 6/2011 | Allen | |
| 2015/0095091 | A1* | 4/2015 | Kamdar | G06Q 10/087 705/7.25 |
| 2019/0392380 | A1* | 12/2019 | O'Brien | G06Q 10/087 |
| 2020/0342476 | A1* | 10/2020 | Garlapati | G06Q 30/0631 |
| 2021/0081865 | A1* | 3/2021 | Darmour | G06Q 10/0838 |
| 2022/0222614 | A1* | 7/2022 | Reynolds | G09F 3/02 |
| 2022/0237530 | A1* | 7/2022 | Franey | G06Q 10/047 |
| 2022/0371626 | A1* | 11/2022 | Franey | G05D 1/0297 |

FOREIGN PATENT DOCUMENTS

| | | |
|---|---|---|
| CN | 109960826 A | 7/2019 |
| CN | 110363454 A | 10/2019 |
| CN | 110874751 A | 3/2020 |
| CN | 111242524 A | 6/2020 |
| CN | 111260119 A | 6/2020 |
| CN | 111429048 A | 7/2020 |
| CN | 111667207 A | 9/2020 |
| CN | 111798167 A | 10/2020 |
| CN | 111806942 A | 10/2020 |
| CN | 112785211 A | 5/2021 |
| CN | 113762885 A | 12/2021 |
| JP | 2015184997 A | 10/2015 |

OTHER PUBLICATIONS

Notice of Allowance dated Sep. 6, 2023 of Chinese Application No. 202110739879.1.

Sai Yao, Storage Strategy and Replenishment Operation Optimization based on T Logistics Center, Logistics Engineering and Management, vol. 42, No. 3, Published on Dec. 31, 2020, p. 58-61.

Shuhong Zhang, Interactive Inventory Replenishment Strategy of Closed-loop Supply Chain Based on Robust Control, Chinese Journal of Management Science, vol. 23, Published on Nov. 30, 2015, p. 525-530.

Jamal Lmariouh et al., The Multi-vehicle Mutli-product Inventory-Routing Problem A case study, 2014 International Conference on Advanced Logistics and Transport(ICALT), Published on Dec. 31, 2014, p. 319-323.

Extended European Search Report dated May 20, 2025 of European Application No. 22831519.8.

Eda Yucel et al., Optimizing product assortment under customer-driven demand substitution, European Journal of Operational Research, p. 759-768.

* cited by examiner

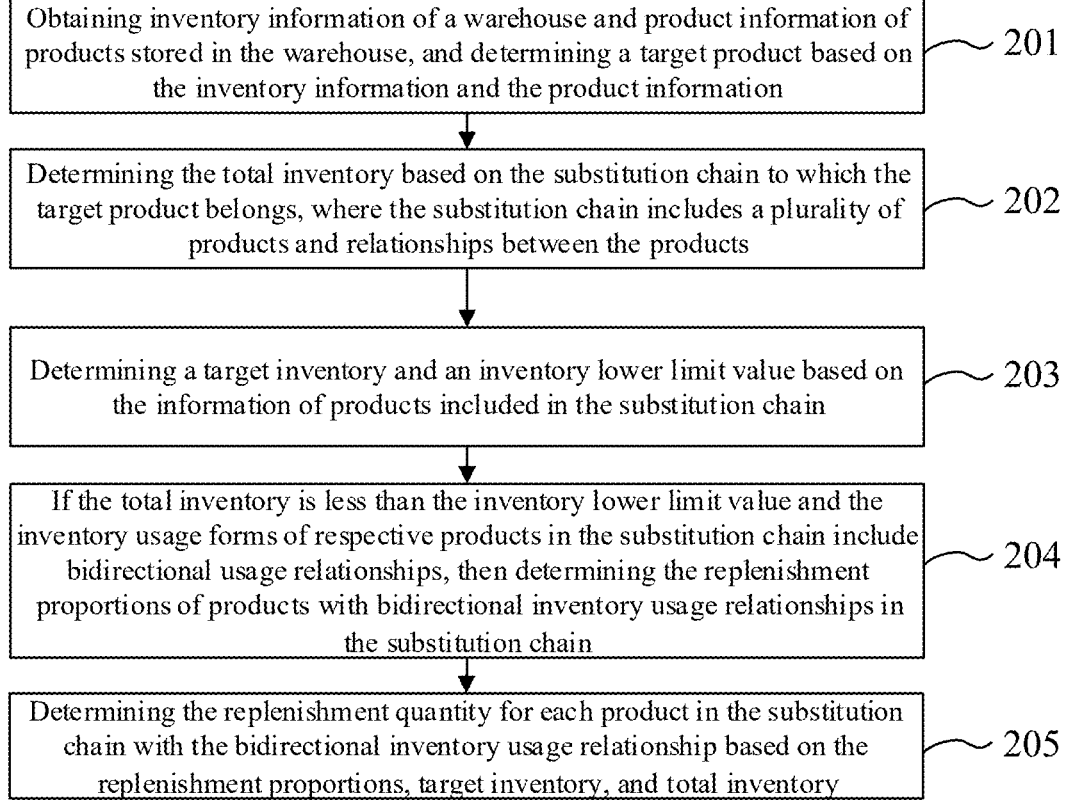

Obtaining inventory information of a warehouse and product information of products stored in the warehouse, and determining a target product based on the inventory information and the product information ~ 201

Determining the total inventory based on the substitution chain to which the target product belongs, where the substitution chain includes a plurality of products and relationships between the products ~ 202

Determining a target inventory and an inventory lower limit value based on the information of products included in the substitution chain ~ 203

If the total inventory is less than the inventory lower limit value and the inventory usage forms of respective products in the substitution chain include bidirectional usage relationships, then determining the replenishment proportions of products with bidirectional inventory usage relationships in the substitution chain ~ 204

Determining the replenishment quantity for each product in the substitution chain with the bidirectional inventory usage relationship based on the replenishment proportions, target inventory, and total inventory ~ 205

FIG. 2

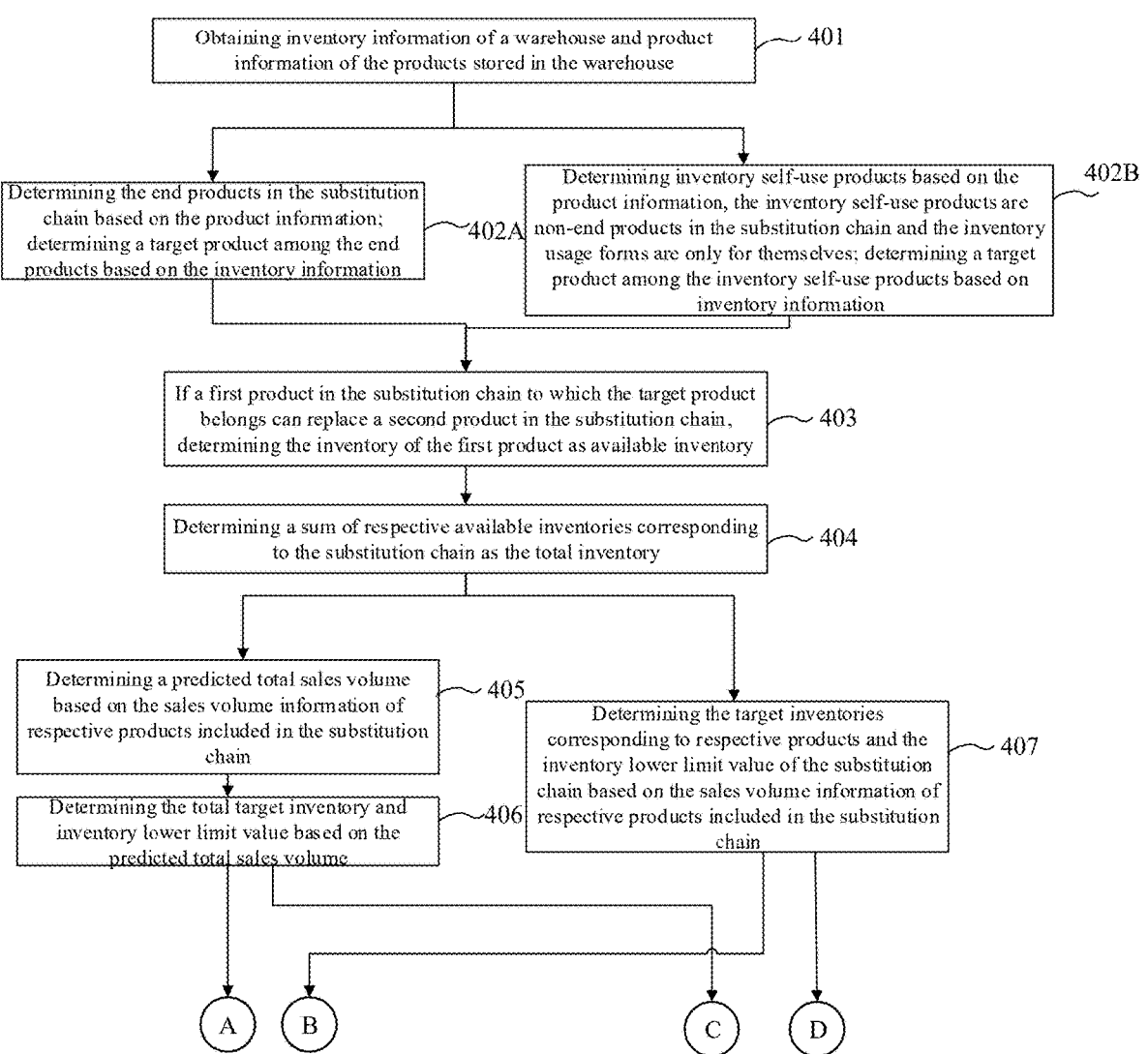
FIG. 4 (cont. on the next page)

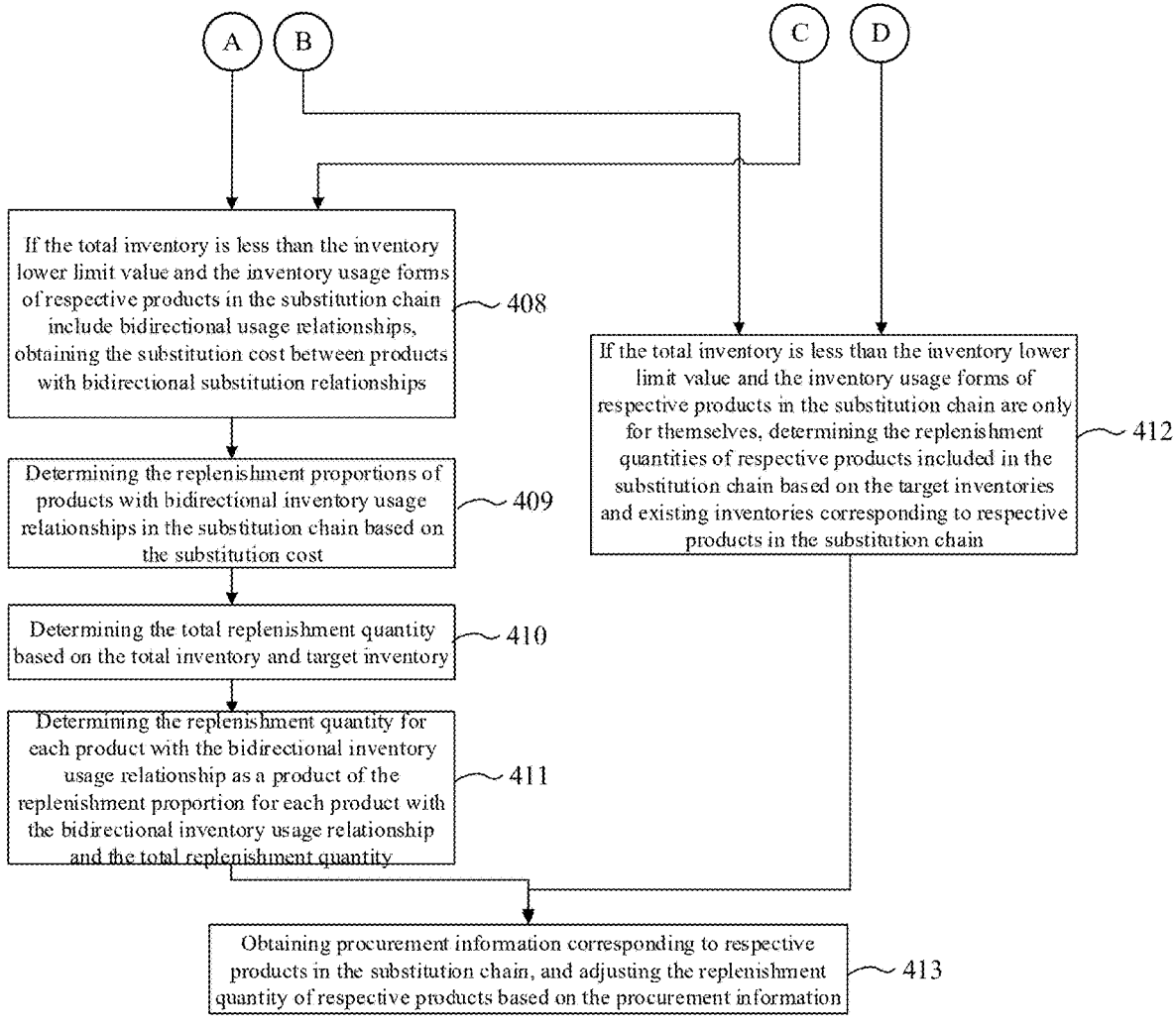
FIG. 4 (cont. from the prior page)

REPLENISHMENT QUANTITY DETERMINATION METHOD AND APPARATUS, DEVICE, STORAGE MEDIUM, AND PROGRAM PRODUCT

CROSS-REFERENCE OF RELATED APPLICATIONS

The present application is a U.S. National Stage of International Application No. PCT/CN2022/094513, filed on May 23, 2022, which claims priority to the Chinese patent application with the application number 202110739879.1, entitled "replenishment quantity determination method and apparatus, storage medium and program product", filed on Jun. 30, 2021, the contents of all of which are incorporated by reference in this application.

TECHNICAL FIELD

This disclosure relates to warehousing technology, and in particular to replenishment quantity determination method and apparatus, device, storage medium, and program product.

BACKGROUND

Currently, both online and offline sales platforms require the establishment of warehouses. Place the products that need to be sold in the warehouse and replenish them when the quantity is insufficient.

In practical applications, there are often situations where multiple products can meet the same market demand. The relationship between these products may be a single item substitution relationship or a bidirectional inventory usage relationship. For example, after a product is updated, the updated product can replace the previous one.

SUMMARY

According to a first aspect of the present disclosure, there is provided a method for determining a replenishment quantity of a product, including: obtaining inventory information of a warehouse and product information of products stored in the warehouse, and determining a target product based on the inventory information and the product information; determining a total inventory based on a substitution chain to which the target product belongs, where the substitution chain includes a plurality of products and relationships between the products; and determining target inventories and an inventory lower limit value based on the product information of the plurality of products included in the substitution chain, where the total inventory represents a sum of available inventories for respective products included in the substitution chain, and the target inventories represent quantities that need to be reached for the inventories of respective products in the substitution chain; if the total inventory is less than the inventory lower limit value, and inventory usage forms of respective products in the substitution chain include bidirectional inventory usage relationships, determining replenishment proportions of products with bidirectional inventory usage relationships in the substitution chain; determining the replenishment quantity for each product with a bidirectional inventory usage relationship in the substitute chain based on the replenishment proportions, the target inventories, and the total inventory.

According to a second aspect of the present disclosure, there is provided a device for determining a replenishment quantity of a product, including: a target product determining unit for obtaining inventory information of a warehouse and product information of products stored in the warehouse, and determining a target product based on the inventory information and the product information; an inventory determining unit for determining a total inventory based on a substitution chain to which the target product belongs, where the substitution chain includes a plurality of products and relationships between products; where, the total inventory represents a sum of available inventories for respective products included in the substitution chain; a standard determining unit for determining target inventories and an inventory lower limit value based on information from the plurality of products included in the substitution chain; where, the target inventories represent quantities that need to be reached for the inventories of respective products in the substitution chain; a replenishment proportion determining unit for determining replenishment proportions of products with bidirectional inventory usage relationships in the substitution chain, if the total inventory is less than the inventory lower limit value, and inventory usage forms for respective products in the substitution chain include bidirectional usage relationships; a replenishment quantity determining unit for determining the replenishment quantity for each product in the substitution chain with a bidirectional inventory usage relationship based on the replenishment proportions, the target inventory, and the total inventory.

According to a third aspect of the present disclosure, there is provided an electronic device, including: a memory; a processor; and computer programs; where the computer programs are stored in the memory and configured to be executed by the processor to implement the method for determining the replenishment quantity of product according to the first aspect.

According to a fourth aspect of the present disclosure, there is provided a computer-readable storage medium, where the computer programs are stored on the computer-readable storage medium, and the computer programs are executed by a processor to implement the method for determining the replenishment quantity of product according to the first aspect.

According to a fifth aspect of the present disclosure, there is provided a computer program product comprising computer programs, wherein the computer programs implements the method for determining the replenishment quantity of product according to the first aspect.

BRIEF DESCRIPTION OF THE DRAWINGS

FIG. 2 is a flowchart of a method for determining the replenishment quantity of the product as shown in an exemplary embodiment of the present disclosure;

FIG. 4 is a flowchart of a method for determining the replenishment quantity of the product as shown in another exemplary embodiment of the present disclosure;

DETAILED DESCRIPTION

At present, many warehouses used for storing products have warehouse management systems set up to manage the items in the warehouse. For example, this system can record information about the products in the warehouse, including product quantity, product name, etc. The warehouse management system can also determine whether to replenish products based on their quantity. For example, when the quantity of a product is low, a corresponding replenishment list can be generated for that product.

However, in practical applications, as products are updated and replaced, there may be substitution relationships between products. For example, the second product is used to replace the first product.

Figure 1:
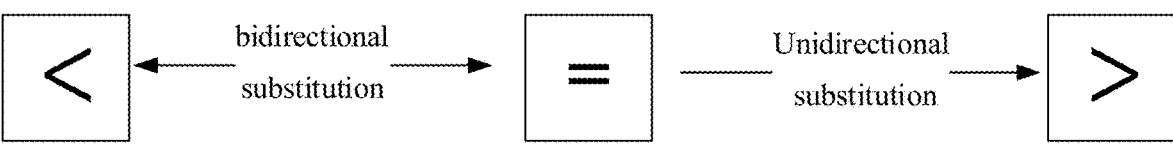
FIG. 1 is a schematic diagram of the substitution relationship between products as shown in an exemplary embodiment of the present disclosure.

FIG. 1 is a schematic diagram of the substitution relationship between products as shown in an exemplary embodiment of the present disclosure.

As shown in FIG. 1, there may be substitution relationships between multiple products. For example, product A can replace product B, and product B can also replace product A. For example, manufacturer upgrades product A and produces product B. When users purchase the product, product A and product B are randomly shipped. In this scenario, there is a situation where product A and product B can be replaced with each other.

Please continue to refer to FIG. 1. For example, in the substitution chain, product B can replace product C, but product C cannot replace product B.

At the same time, there is also an inventory usage relationship between products. For example, if the inventory of product A can be used by product B, and the inventory of product B can be used by product A, then it can be considered that the inventory usage relationship between products A and B is bidirectional.

For products with a bidirectional inventory usage relationship, both products can be restocked. However, how to allocate the replenishment quantity for respective products to ensure that the replenishment is sufficient without causing product backlog and affecting normal sales is a technical problem that needs to be solved.

Therefore, the technical issue addressed in the present disclosure is how to effectively manage inventory when there is a substitution relationship between products, and how to determine the replenishment quantities for respective products with bidirectional inventory usage relationships.

FIG. 2 is a flowchart of a method for determining the replenishment quantity of a product as shown in an exemplary embodiment of the present disclosure.

As shown in FIG. 2, the method provided in this embodiment for determining product replenishment quantity includes: Step 201, obtaining inventory information of a warehouse and product information of products stored in the warehouse, and determining a target product based on the inventory information and the product information.

The method provided in this disclosure can be executed by an electronic device with computing power. The electronic device can be a separate device, such as a computer, which can serve as a server for the warehouse management system. The electronic device can also be multiple devices used for warehouse management, such as cluster servers.

The method provided in this disclosure can be set in the warehouse management system, so that the warehouse management system can reasonably determine the replenishment quantity of products in the warehouse based on the method provided in this disclosure. The replenishment quantity is used to replenish products in the warehouse.

Specifically, the electronic device can obtain inventory information of the warehouse. For example, a warehouse management system is used to manage a first warehouse and a second warehouse. When determining the replenishment quantity of products in the first warehouse, the electronic device can obtain inventory information of the first warehouse. When determining the replenishment quantity of products in the second warehouse, the electronic device can obtain inventory information of the second warehouse.

Furthermore, the warehouse information can include a plurality of information such as black-and-white lists, construction and storage, warehouse networks, and warehouse products.

In practical application, the electronic device can also obtain product information of products stored in the warehouse when determining the replenishment quantity of products. For example, a warehouse management system is used to manage a first warehouse and a second warehouse. When determining the replenishment quantity of products in the first warehouse, the electronic device can obtain product information of products stored in the first warehouse. When determining the replenishment quantity of products in the second warehouse, the electronic device can obtain product information of products in the second warehouse.

The product information of a product can include the substitution chain in which the product is located, such as other products that the product replaces, as well as other products used to replace the product.

Specifically, products that can be restocked can be selected based on the product information. For example, if a product is the end product in the substitution chain, it is a product that can be restocked. The end product is the product at the end of the substitution chain, and compared to other products in the substitution chain, the end product is the latest product in the upgrade process.

For example, if an arrow is used to represent the substitution relationship between products, and the first product replaces the second product, then an arrow from the first product to the second product can be used to connect the two. Products only with arrow tails connected in the substitution chain can be products that can be restocked. If the substitution chain includes a bidirectional substitution relationship, for example, the first product points to the second product, and the second product also points to the first product, then the substitution relationship can be split into two situations to obtain two substitution sub chains, and the products that can be restocked can be determined based on the arrow direction.

Figure 3:
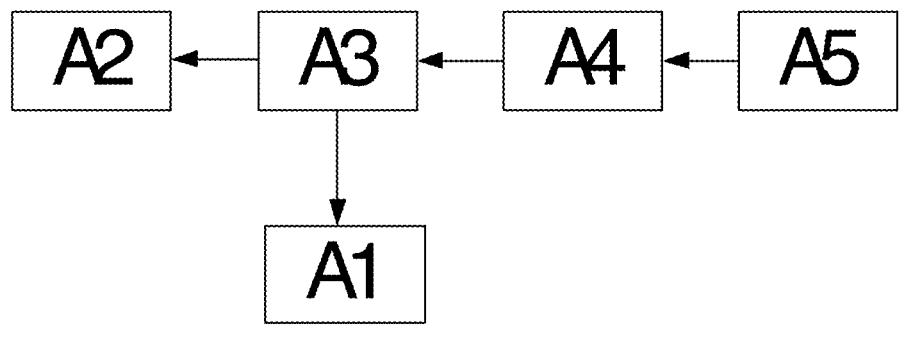
FIG. 3 is a schematic diagram of an substitution chain as shown in an exemplary embodiment of the present disclosure.

FIG. 3 is a schematic diagram of a substitution chain as shown in an exemplary embodiment of the present disclosure.

As shown in FIG. 3, if Product A5 replaces Product A4, Product A4 replaces Product A3, Product A3 replaces Product A2, and Product A3 replaces Product A1, then Product A5 is the end product in the substitution chain.

Further based on inventory information, a target product can be determined among products that can be restocked.

Specifically, a target product that meets replenishment criteria can be selected based on a plurality of information such as black-and-white lists, construction and storage, warehouse networks, and inventory products.

The method further includes: Step 202, determining the total inventory based on the substitution chain to which the target product belongs, where the substitution chain includes a plurality of products and relationships between the products.

Furthermore, after determining the target product, the substitution chain to which the target product belongs can be determined based on the product information of the target product. The substitution chain includes a plurality of products and relationships between the products. The relationship between the products can include both the substitution relationship between products and the inventory usage relationship between products. For example, the substitution chain shown in FIG. 3 includes 5 products. The substitution chain can also include the relationship between the products.

In practical application, information on respective products included in the substitution chain can be obtained to determine the total inventory. This total inventory represents the sum of available inventories for respective products included in the substitution chain. For example, the substitution chain includes 5 products in total, and the sum of available inventories for these 5 products is the total inventory.

There may be some products in the substitution chain that are about to end their lifecycle. For example, if a product is replaced by another product and it is not used to replace other products, it is considered to be a product that is about to end its lifecycle. Therefore, the inventory of the product is defined as unavailable. In this case, the inventory of the product is not included in the total inventory.

Specifically, the total inventory can be determined based on the substitution relationships in the substitution chain and the inventory information of respective products.

The method further includes: Step 203, determining a target inventory and an inventory lower limit value based on the information of products included in the substitution chain.

Furthermore, the target inventory can be determined based on the information of respective products in the substitution chain. The target inventory refers to the total amount of inventory that needs to be prepared corresponding to the substitution chain. For example, the sales volumes of respective products in the substitution chain can be predicted, and then the target inventory corresponding to the substitution chain can be determined based on the sales volumes of these products.

The determined target inventory can be the target inventory of a single product or the total target inventory of respective products in the substitution chain.

In practical application, determining the inventory quantity that should be prepared for the product based on the actual sales situation of products can ensure that the inventory meets the sales volume and avoid product backlog.

A total sales volume can be determined based on the sales volumes of respective products in the substitution chain, and then the existing model can be used to process the total sales volume to obtain the target inventory. Existing models can also be used to process the sales volume of respective products in the substitution chain, in order to obtain the corresponding target inventory for respective products.

Specifically, the inventory lower limit value is a threshold. When the existing inventory is below this threshold, it can be considered that the inventory is insufficient to support the normal sales of products in the substitution chain. In this case, replenishment can be conducted for respective products in the substitution chain.

For example, the inventory lower limit value can be determined based on the sales situation of respective products in the substitution chain. For example, the total sales volume can be determined based on the sales volumes of respective products in the substitution chain, and then the total sales volume can be processed based on the existing model mentioned above to obtain the inventory lower limit value.

In the practical application process, there are no restrictions on the timings of determining the total inventory, and determining the target inventory and inventory lower limit value.

The method further includes: Step 204, if the total inventory is less than the inventory lower limit value and the inventory usage forms of respective products in the substitution chain include bidirectional usage relationships, then determining the replenishment proportions of products with bidirectional inventory usage relationships in the substitution chain.

The replenishment proportion is used to represent the proportion of the replenishment volume of a product in the substitution chain to the total replenishment volume of the substitution chain when replenishing respective products in the substitution chain.

The replenishment proportion of a product can be determined based on the information of the product, in order to more reasonably allocate the replenishment proportion for products with bidirectional inventory usage relationships in the substitution chain. For example, the replenishment volumes of respective products can be adjusted by adjusting the replenishment proportions. When restocking respective products based on the replenishment volumes, it results in lower costs or higher profits. In this way, inventory management in the warehouse can be more reasonable.

Specifically, if the total inventory corresponding to the substitution chain is lower than the inventory lower limit value corresponding to the substitution chain, it indicates that the inventory corresponding to the substitution chain is insufficient. In this case, replenishment can be conducted for respective products included in the substitution chain to ensure that the inventory can meet sales demand.

In practical application, the total inventory is the quantity of existing products corresponding to the substitution chain, and the inventory lower limit value is the threshold that can meet sales demand corresponding to the substitution chain. Therefore, when the total inventory is lower than the inventory lower limit value, the current inventory does not meet sales demand and replenishment needs to be conducted.

Furthermore, if the inventory usage forms of respective products in the substitution chain include bidirectional usage relationship, then the replenishment proportion of products with bidirectional inventory usage relationships in the substitution chain can be determined, and the replenishment quantity of products can be determined based on the replenishment proportion of products.

For two products with a bidirectional inventory usage relationship, the inventory relationship can be for oneself only, or the inventory relationship can be a bidirectional inventory usage relationship.

For example, product A0 can replace product A1, and product A1 can also replace product A0. At the same time, the inventory of product A0 can be used by A1, and the inventory of product A1 can also be used by A0.

For example, product A0 can replace product A1, and product A1 can also replace product A0. At the same time, the inventory of product A0 can only be used by A0, and the inventory of product A1 can only be used by A1.

When the substitution relationship between products is bidirectional and the inventory usage form is also bidirectional, the replenishment proportion of products with bidirectional inventory usage relationship can be determined.

In an optional embodiment, respective products in the substitution chain can correspond to a bidirectional inventory usage relationship or a unidirectional inventory usage relationship. Only products with bidirectional inventory usage relationships can be restocked, as these products can replace other products, resulting in a lower likelihood of backlog.

For example, a product can only be replaced by other products. For example, product A1 replaces product A0, product A2 replaces product A1, and A1 can also replace A2. Since product A0 can only be replaced by other products, its service life has expired, so it is possible not to restock product A0.

The substitution between products has costs. For example, when using product A to replace product B, there may be some substitution costs, such as transportation costs, storage costs, etc. The total substitution cost of respective products in the substitution chain can be determined based on the substitution costs, so that the replenishment proportions of respective products at the lowest total substitution cost can be determined as the final replenishment proportions of the products.

For example, the profits of different products may vary. For example, when using product A to replace product B, there may be a certain profit margin. Based on substitution, for example, the total substitution profit of respective products in the substitution chain can be determined, so that the replenishment proportions of respective products at the highest total substitution profit can be determined as the final replenishment proportions of the products.

It is also possible to determine the replenishment proportions of products with a bidirectional inventory usage relationship based on the substitution cost and substitution profit between products.

The method further includes: Step 205, determining the replenishment quantity for each product in the substitution chain with the bidirectional inventory usage relationship based on the replenishment proportions, target inventory, and total inventory.

The total replenishment quantity of respective products in the substitution chain can be determined based on the determined target inventory and total inventory. Therefore, the replenishment quantity for each product with bidirectional inventory usage relationship can be determined based on the replenishment proportion for each product with bidirectional inventory usage relationship and the total replenishment quantity of respective products. Based on the determined replenishment quantity, each product with bidirectional inventory usage relationship can be replenished.

Specifically, after replenishing the products based on the determined replenishment quantities, the total existing inventory of respective products reaches the target inventory.

Furthermore, the inventory management system can also record various product packaging rules, minimum order quantity rules, etc., which can be used to revise the determined replenishment quantity. For example, if the replenishment quantity for product A1 is 50 and the packaging rule for product A1 is 6 pieces per box, the replenishment quantity can be corrected to 54 pieces so as to conform to the actual procurement method.

In practical application, the inventory management system can generate a replenishment list based on the determined replenishment quantity, which allows warehouse management personnel to process replenishment based on the replenishment list.

In an optional embodiment, a replenishment list can also be sent to the supplier side to enable the supplier to ship to the warehouse based on the replenishment list.

The method provided in this embodiment is used to determine the replenishment quantity of products. The method is executed by a device equipped with the method provided in this embodiment. The device is typically implemented in hardware and/or software.

The method for determining the replenishment quantity of products provided in this embodiment includes: obtaining inventory information of a warehouse and product information of the products stored in the warehouse; determining a target product based on the inventory information and the product information; determining a total inventory based on a substitution chain to which the target product belongs, where the substitution chain includes a plurality of products and relationships between the products; and determining a target inventory and an inventory lower limit value based on the product information of multiple products included in the substitution chain; where the total inventory is used to represent the total available inventory of respective products included in the substitution chain, while the target inventory represents the quantity that the inventory of respective products in the substitution chain needs to reach; if the total inventory is less than the inventory lower limit value and the inventory usage forms of respective products in the substitution chain includes bidirectional usage relationship, then determining the replenishment proportions of products with bidirectional inventory usage relationship in the substitution chain; determining the replenishment quantity for each product with the bidirectional inventory usage relationship in the substitution chain based on the respective replenishment proportions, target inventory, and total inventory. In the method provided in the present disclosure, the replenishment quantity of respective products can be determined based on the substitution relationship between products and product information. In the case where there are substitution relationships between products, the replenishment quantities of respective products can be determined, thus enabling effective management of product inventory. Moreover, when determining the replenishment quantities of respective products, the replenishment proportion for each product with a bidirectional inventory usage relationship can be determined, so that the replenishment quantities of respective products can be more reasonably allocated based on this proportion, in order to reduce the costs incurred in the product substitution process or increase the profits generated in the product substitution process.

FIG. 4 is a flowchart of a method for determining product replenishment quantity as shown in another exemplary embodiment of the present disclosure.

As shown in FIG. 4, the method provided in this embodiment for determining product replenishment quantity includes: Step 401, obtaining inventory information of a warehouse and product information of the products stored in the warehouse.

The specific principles and implementation methods of step 401 are similar to those of step 201, and will not be repeated here.

The method further includes: Step 402A, determining the end products in the substitution chain based on the product information; determining a target product among the end products based on the inventory information.

The product information can include a substitution chain to which the product belongs, as well as substitution relationships with other products. Therefore, the end product in the substitution chain can be determined based on the product information.

Specifically, the end product is a product at the end of in the substitution chain. The end product can only be used to replace other products and not be replaced by other products. The end product can also have a bidirectional inventory usage relationship with other products. For example, a first product at the end of the substitution chain, and the first product can replace a second product, and the second product can also replace the first product, and the inventory of the two can also be used interchangeably.

Furthermore, as the products change, it can be considered that the end product is the latest generation of product in the substitution chain.

In practical application, the target product can be determined in the end products based on inventory information. The target product is a product that meets replenishment criteria.

For example, the inventory information can include blacklists and whitelists. If one of the end products appears on the blacklist, it does not meet the replenishment criteria. For example, the inventory information also includes the inventory quantities of respective products. If the inventory quantity of one of the end products exceeds the preset threshold, it can be considered that the end product does not meet the replenishment criteria.

In this way, a target product that meets replenishment criteria can be determined based on the product's own situation and the inventory information.

The method further includes: Step 402B, determining inventory self-use products based on the product information, the inventory self-use products are non-end products in the substitution chain and the inventory usage forms are only for themselves; determining a target product among the inventory self-use products based on inventory information.

The product information can include the substitution chain to which the product belongs, and substitution relationships with other products. Therefore, non-end products in the substitution chain can be determined based on the product information.

Specifically, the product information can also include the inventory usage forms of the products. For example, the inventory usage form can be only used for this product, unidirectional usage or bidirectional usage.

Furthermore, the inventory usage form being only used for this product means that the inventory of the product is only for its own use.

Figure 5:
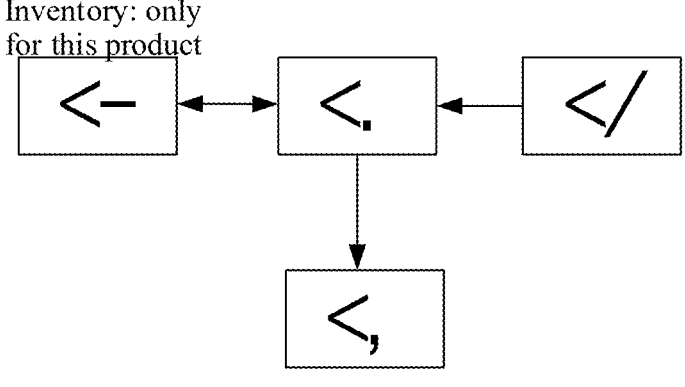
FIG. 5 is a schematic diagram of an substitution chain as shown in an exemplary embodiment of the present disclosure.

FIG. 5 is a schematic diagram of a substitution chain shown in an exemplary embodiment of the present disclosure.

As shown in FIG. 5, product A4 replaces product A3, product A3 replaces product A2, and product A2 can also replace product A3, Product A3 replaces product A1, Products A1, A2, and A3 are all non-end products.

There are also inventory usage forms between products. For example, if the usage form of product A2 is only for this product, the inventory of A2 cannot be used to replace other products when selling other products. For example, when selling A3, A2 cannot be used for shipping.

In more detail, the substitution relationship between products in the substitution chain refers to the substitutable relationship between products during the product replacement process. The inventory usage form is whether the inventory of a single product can be provided to other products for use. For example, the inventory of A3 is 3, and the inventory of A2 is 5. When the sales quantity of A3 is 4, the inventory of A2 cannot be used for replenishment.

In practical application, if the inventory usage form of a product is only for itself, it is determined as an inventory self-use product. The target product can be determined in the inventory self-use products based on inventory information.

For example, the inventory information can include blacklists and whitelists. If an inventory self-use product appears on the blacklist, it does not meet the replenishment criteria. For example, the inventory information also includes the inventory quantity of respective products. If the inventory quantity of an inventory self-use product exceeds the preset threshold, it can be considered that the inventory self-use product does not meet the replenishment criteria.

In this way, target products that meet replenishment criteria can be determined based on the product's own situation and inventory information.

The method further includes: Step 403, if a first product in the substitution chain to which the target product belongs can replace a second product in the substitution chain, determining the inventory of the first product as available inventory.

The total inventory corresponding to the substitution chain to which the target product belongs can be determined. Specifically, the available inventory for the substitution chain can be determined first.

Specifically, if the first product in the substitution chain can replace the second product in the substitution chain, it indicates that the first product can replace other products, and its inventory can be applied to other products in the substitution chain. In this case, the inventory of the first product can be considered as available inventory.

Furthermore, if the third product in the substitution chain does not replace any other product, it indicates that the life cycle of the third product has ended. After the inventory of the third product is cleared, it will no longer be sold. Therefore, the inventory of the third product can be considered as non-available inventory in the substitution chain.

In an optional embodiment, a product can have both spot inventory and in-transit inventory. The spot inventory refers to the existing quantity of a product in the warehouse, while in-transit inventory refers to the quantity of that product which is in the process of transportation to the warehouse. The sum of the spot inventory and in-transit inventory of the first product can be determined as the available inventory of the first product.

For example, if the spot inventory of the first product is M1 and the in-transit inventory of the first product is M2, the sum of M1 and M2 can be used as the available inventory of the first product.

The method further includes: Step 404, determining a sum of respective available inventories corresponding to the substitution chain as the total inventory.

In practical application, the total inventory corresponding to the substitution chain can be obtained by adding up the available inventories of the substitution chain.

For example, if there are 5 products in the substitution chain, and only one product does not replace any other product, then it can be considered that there are 4 first products in the substitution chain. In this case, the inventories of these 4 first products can be considered as available inventories, and the sum of the inventories of these four products can be used as the total inventory corresponding to the substitution chain.

In an optional embodiment, the total inventory is Sn;

$$S_n = \sum_{i=1}^{n}(S_i + O_i) \times L_i$$

Si is the spot inventory of product Ai, Oi is the in-transit inventory of product Ai. When product Ai can replace any product on the substitution chain, Li=1, otherwise, Li=0.

Specifically, when product Ai can replace any product on the substitution chain, product Ai is the first product and its inventory is available. Therefore, by setting the coefficient Li, whether to determine the total inventory based on the inventory of the product can be controlled.

Furthermore, if product Ai can replace any product on the substitution chain, then Li=1. At this point, the total inventory is determined by summarizing the inventory of product Ai. Otherwise, Li=0, the inventory of product Ai is not used to determine the total inventory.

In this way, it is possible to traverse respective products in the substitution chain and determine whether to use the inventory of that product to determine the total inventory of the substitution chain based on the product's own situation.

In the method provided in this disclosure, the target inventory can be determined based on steps 405-406 below, or the target inventory can be determined based on step 407.

The method further includes: Step 405, determining a predicted total sales volume based on the sales volume information of respective products included in the substitution chain.

In practical applications, the information of respective products can also include product sales volume information. For example, it can be the sales volume of the product over a period of time, such as a sales volume for one day or a sales volume for one week.

In one embodiment, the predicted total sales volume corresponding to the substitution chain can be obtained by summarizing the sales volume of respective products. Since the substitution chain includes a plurality of products, and each product has its own sales volume information, the total sales volume of the entire substitution chain can be predicted based on the sales volume of these products over a period of time.

The method further includes: Step 406, determining the total target inventory and inventory lower limit value based on the predicted total sales volume.

A model can be pre-set to determine the total target inventory and inventory lower limit value. The predicted total sales volume can be input into the model to obtain the total target inventory and inventory lower limit value of the substitution chain.

When replenishing respective products in the substitution chain, the sum of the inventories of the plurality of products included in the substitution chain should reach the total target inventory. In the sales process, the total inventory of the plurality of products included in the substitution chain should be higher than the inventory lower limit value to meet sales demand.

The method further includes: Step 407, determining the target inventories corresponding to respective products and the inventory lower limit value of the substitution chain based on the sales volume information of respective products included in the substitution chain.

In another embodiment, a model for determining target inventory and inventory lower limit value can be pre-set. Sales volume information for each product in the substitution chain can be input into the model to obtain the target inventory corresponding to each product in the substitution chain.

The model can also output the inventory lower limit value corresponding to each product, and the sum of these inventory lower limit values can be determined as the inventory lower limit value of the substitution chain.

When replenishing respective products in the substitution chain, the sum of the inventories of the plurality of products included in the substitution chain should reach the target inventory of the product. In the sales process, the sum of the inventories of the plurality of products included in the substitution chain should be higher than the inventory lower limit value of the substitution chain to meet sales demand.

In the method provided in this disclosure, if the inventory usage forms between products in the substitution chain include unidirectional usage relationships and/or bidirectional usage relationships, then step 408 can be performed. If the inventory usage form of respective products in the substitution chain is only for this product, then step 412 can be performed.

The method further includes: Step 408, if the total inventory is less than the inventory lower limit value and the inventory usage forms of respective products in the substitution chain include bidirectional usage relationships, obtaining the substitution cost between products with bidirectional substitution relationships.

If the total inventory determined in step 404 is less than the inventory lower limit value determined in steps 406 or 407, it indicates that the current inventory of the product does not meet sales demand and needs to be restocked.

Specifically, if the inventory usage forms of respective products included in the substitution chain are unidirectional substitution relationships or bidirectional inventory usage relationships, it indicates that the inventory of products in the substitution chain can be replaced by other products. In this case, the replenishment proportions of respective products in the substitution chain can be determined based on preset rules.

The substitution cost between products with bidirectional inventory usage relationships can be pre-set. For example, if product A1 can replace product A0, and product A0 can also replace product A1, the cost required for product A0 to replace product A1 and the cost required for product A1 to replace product A0 can be pre-set.

Specifically, the electronic device can determine the replenishment proportions of respective products based on the substitution cost between products, thereby allocating the replenishment proportion more reasonably for each product with a bidirectional inventory usage relationship. When allocating replenishment quantity for each product with a bidirectional inventory usage relationship based on this replenishment proportion, it allows for replenishment of products in the substitution chain at a lower cost.

The method further includes: Step 409, determining the replenishment proportions of products with bidirectional inventory usage relationships in the substitution chain based on the substitution cost.

Specifically, the electronic device can determine the replenishment proportion for each product with a bidirectional inventory usage relationship based on the obtained substitution cost, thereby allocating replenishment proportions for respective products more reasonably.

Furthermore, the electronic device can determine the total substitution cost between products that can be replaced in both directions based on the substitution cost between products that can be replaced in both directions and the random replenishment proportions.

The preset replenishment proportion can be randomly set by the electronic device. Each random replenishment proportion is greater than or equal to 0, and the sum of the random replenishment proportions between respective products is 1. For example, if product A0 can replace product A1, and product A1 can replace product A0, a random replenishment proportion of r0 can be set for product A0, and a random replenishment proportion of r1 can also be set for product A1.

In practical application, the total substitution cost of the product with bidirectional inventory usage relationships can be determined based on the random replenishment proportions of respective products determined each time, as well as the substitution cost between products. Specifically, the product of the random replenishment proportion of a product and the cost of replacing other products with that product can be determined as the total substitution cost of that product.

For example, the random replenishment proportion of product A0 is r0, and the substitution cost of product A0 replacing product A1 is c01. Therefore, the total substitution cost of product A0 is r0*c01.

Afterwards, the electronic device can determine the total substitution cost of the substitution chain based on the total substitution cost between products, and determine the random replenishment proportions of products with bidirectional inventory usage relationships in the substitution chain as the replenishment proportions of products with the lowest total substitution cost in the substitution chain.

The electronic device can take the sum of the total substitution costs of products with bidirectional inventory usage relationships as the total substitution cost of the substitution chain.

For example, if the substitution chain includes n products with bidirectional inventory usage relationships, the total substitution cost of the substitution chain is:

$$\sum c_{ji} r_j$$

Among them, i and j represent two products with a bidirectional inventory usage relationship, rj represents the random replenishment proportion of product j, and cji represents the substitution cost of product j replacing product i. The total substitution cost for each product with a bidirectional inventory usage relationship can be added up to obtain the total substitution cost for that substitution chain.

Specifically, if the user pre-sets the fixed replenishment proportion of the product, the electronic device can obtain the fixed replenishment proportion of the product when obtaining the random replenishment proportions of respective products.

The method further includes: Step 410, determining the total replenishment quantity based on the total inventory and target inventory.

For example, this step can be performed based on the total target inventory determined in steps 405-406. Alternatively, the total inventory is determined based on the target inventories for respective products obtained in step 407, and then this step can be performed.

The target inventory is the determined inventory that can meet the predicted sales volume, and the total inventory is the current existing inventory. Therefore, the difference between the target inventory and the total inventory can be used as the total replenishment quantity.

For example, the total replenishment quantity Pn is:

$$P_n = T_n - S_n;\ S_n = \sum\nolimits_{i=1}^{n} (S_i + O_i) \times L_i$$

Among them, Tn represents the target inventory of the substitution chain.

The method further includes: Step 411, determining the replenishment quantity for each product with the bidirectional inventory usage relationship as a product of the replenishment proportion for each product with the bidirectional inventory usage relationship and the total replenishment quantity.

Specifically, the total replenishment quantity is the sum of the replenishment quantities for respective products in the substitution chain. For example, if the substitution chain includes four products with replenishment quantities of C1, C2, C3, and C4, then the sum of C1, C2, C3, and C4 is the total replenishment quantity.

Furthermore, it is necessary to allocate the total replenishment quantity to each product with a bidirectional inventory usage relationship, in order to obtain the replenishment quantity for each product with a bidirectional inventory usage relationship included in the substitution chain. For example, the product of the replenishment proportions of respective products included in the substitution chain and the total replenishment quantity can be used as the corresponding replenishment quantities for respective products.

In practical application, the replenishment proportion is determined based on the substitution cost between products. When determining the replenishment quantities of respective products based on the replenishment proportions, the total replenishment quantity can be more reasonably allocated to respective products, thereby reducing the cost generated by replenishment for respective products in the substitution chain.

For example, if the total replenishment quantity of the substitution chain is Pn, and the replenishment proportion of one product is r1, then the replenishment quantity of that product is Pn*r1.

The method further includes: Step 412, if the total inventory is less than the inventory lower limit value and the inventory usage forms of respective products in the substitution chain are only for themselves, determining the replenishment quantities of respective products included in the substitution chain based on the target inventories and existing inventories corresponding to respective products in the substitution chain.

If the total inventory determined in step 404 is less than the inventory lower limit value determined in steps 406 or 407, it indicates that the current inventory of the product does not meet sales demand and needs to be restocked.

Specifically, if the inventory usage form of respective products included in the substitution chain is only for this product, it indicates that the inventories of the products in the substitution chain cannot be used by other products. In this case, the replenishment quantities of respective products included in the substitution chain can be determined based on the target inventory and existing inventory of respective products in the substitution chain.

Figure 6:
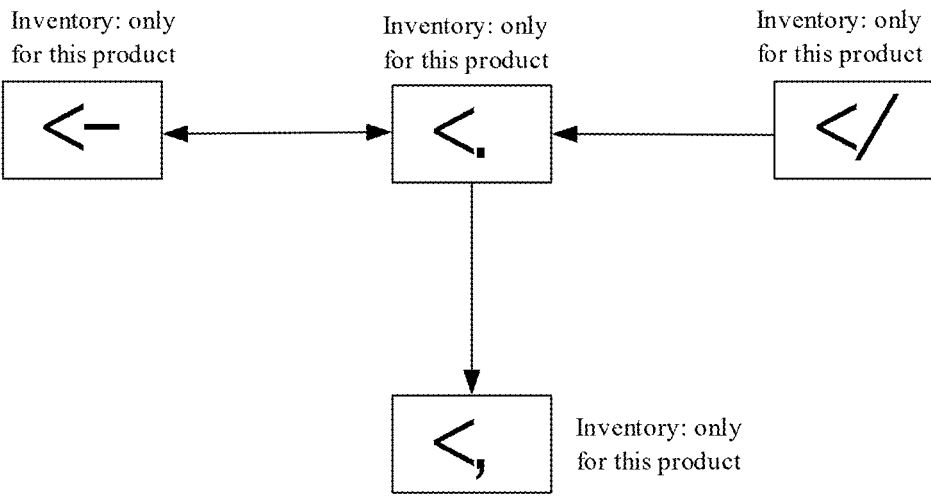
FIG. 6 is a schematic diagram of the substitution chain as shown in another exemplary embodiment of the present disclosure.

FIG. 6 is a schematic diagram of a substitution chain illustrated in another exemplary embodiment of the present disclosure.

As shown in FIG. 6, during the product update iteration process, product A4 can replace product A3, product A3 can replace product A2, product A2 can also replace product A3, and product A3 can also replace product A1.

In addition, there are also inventory usage forms between products. For example, the inventory usage forms of products A1, A2, A3, and A4 are only for this product.

If the inventory usage forms of respective products in the substitution chain are only for this product, it indicates that the inventories of respective products in the substitution chain cannot be used by other products. Therefore, the latest product in the substitution chain can be restocked without restocking other products.

Specifically, the replenishment quantities of respective products included in the substitution chain can be determined based on the target inventories and existing inventories corresponding to respective products in the substitution chain.

In one embodiment, the demand quantities corresponding to respective products can be determined based on the target inventories and existing inventories of respective products. For example, the demand quantity corresponding to each product can be determined based on the target inventories of respective products determined in step 407 and the existing inventories of these products.

For example, the demand quantity Pi for product Ai is:

$$P_i = T_i - (S_i + O_i)$$

Furthermore, the sum of the demand quantities for respective products can be used as the replenishment quantity for the end product in the substitution chain, and the replenishment quantities for other products in the substitution chain can be determined as 0. For example, if the substitution chain includes n products, the replenishment quantity Pn for the end product An is:

$$P_n = \sum_{i=1}^{n} P_i$$

In this embodiment, products of which inventories cannot be applied to other products are not restocked, and only the latest products are restocked. This can quickly clear the inventory of products with earlier updates in the substitution chain and release more inventory to the latest products.

The method further includes: Step 413, obtaining procurement information corresponding to respective products in the substitution chain, and adjusting the replenishment quantity of respective products based on the procurement information.

In an optional embodiment, the electronic device can also obtain procurement information for respective products in the substitution chain. For example, corresponding procurement information for respective products can be set in the warehouse management system.

For example, the procurement information includes the minimum order quantity of the product, and can also include packaging information of the product. The determined replenishment quantity can be adjusted based on the procurement information.

Due to the possibility that the determined replenishment quantity for respective products may not meet the minimum order quantity, the replenishment quantity can be adjusted based on the minimum order quantity, so that the adjusted replenishment quantity is greater than or equal to the minimum order quantity. For example, if the minimum order quantity for a product is 500 pieces and the replenishment quantity for the product is determined to be 450 pieces based on the above steps, then the replenishment quantity for the product can be adjusted to 500 pieces.

It is also possible that the quantity of the product does not comply with the packaging rule of the product, so the replenishment quantity can be adjusted based on the packaging information of the product. For example, if the replenishment quantity of a product is 310, but the packaging information of the product is 40 pieces per box, then the current replenishment quantity cannot be purchased as a full box. Therefore, the replenishment quantity of the product can be adjusted to 320 pieces.

In this way, the adjusted replenishment quantity of the product can be made to comply with the procurement rules, allowing for direct replenishment based on the adjusted replenishment quantity of the product.

Figure 7:
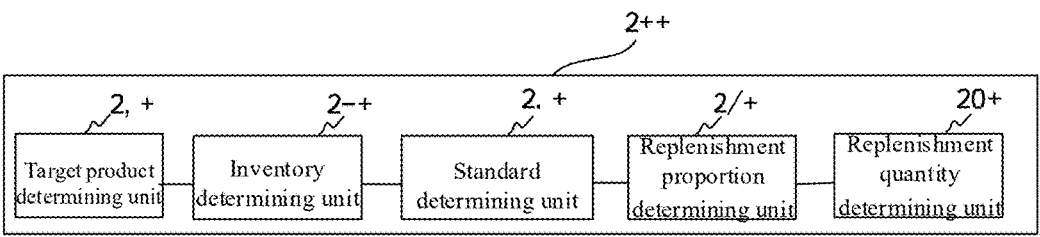
FIG. 7 is a structural diagram of a device for determining the replenishment quantity of the product as shown in an exemplary embodiment of the present disclosure.

FIG. 7 is a structural diagram of a device for determining replenishment quantity of the product as shown in an exemplary embodiment of the present disclosure.

As shown in FIG. 7, the device 700 provided in this embodiment for determining replenishment quantity of the product includes a target product determining unit 710, an inventory determining unit 720, a standard determining unit 730, a replenishment proportion determining unit 740 and a replenishment quantity determining unit 750.

The target product determining unit 710 is configured to obtain inventory information of the warehouse and product information of the products stored in the warehouse, and determine the target product based on the inventory information and the product information.

The inventory determining unit 720 is configured to determine the total inventory based on the substitution chain to which the target product belongs. The substitution chain includes a plurality of products and relationships between products. The total inventory represents the sum of available inventories of respective products included in the substitution chain.

The standard determining unit 730 is configured to determine target inventory and inventory lower limit value based on information of the plurality of products included in the substitution chain. The target inventory represents the quantities that need to be reached for the inventories of respective products in the substitution chain.

The replenishment proportion determining unit 740 is configured to determine the replenishment proportions of products with bidirectional inventory usage relationships in the substitution chain if the total inventory is less than the inventory lower limit value, and the inventory usage forms of respective products in the substitution chain include bidirectional inventory usage relationships.

The replenishment quantity determining unit 750 is configured to determine the replenishment quantity for each product with a bidirectional inventory usage relationship in the substitution chain based on the replenishment proportions, the target inventory, and the total inventory.

The device provided in this disclosure for determining the replenishment quantity of products includes: a target product determining unit configured to obtain inventory information of the warehouse and product information of the products stored in the warehouse, and to determine a target product based on inventory information and the product information; an inventory determining unit configured to determine a total inventory based on the substitution chain to which the target product belongs, where the substitution chain includes a plurality of products and relationships between the products; the total inventory represents a sum of available inventories of respective products included in the substitution chain; a standard determining unit configured to determine a target inventory and an inventory lower limit value based on the information of the plurality of products included in the substitution chain; the target inventory represents quantities that need to be reached for the inventories of respective products in the substitution chain; a replenishment proportion determining unit configured to determine the replenishment proportions for products with bidirectional inventory usage relationships in the substitution chain, if the total inventory is less than the inventory lower limit value and the inventory usage forms of respective products in the substitution chain include bidirectional inventory usage relationships; a replenishment quantity determining unit configured to determine the replenishment quantity for each product in the substitution chain with a bidirectional inventory usage relationship based on the replenishment proportions, target inventory, and total inventory. The device provided in this disclosure can determine the replenishment quantities of respective products based on the substitution relationship between products and product information, and can determine the replenishment quantity of respective products when there is a substitution relationship between products, thus effectively managing product inventory. Moreover, when determining the replenishment quantities of respective products, the replenishment proportion for each product with a bidirectional inventory usage relationship can be determined, so that the replenishment quantities of respective products can be more reasonably allocated based on the proportions, in order to reduce the costs incurred in the product substitution process or increase the profits generated in the product substitution process.

The specific principle and implementation method of the device for determining replenishment quantity of product provided in this embodiment are similar to the embodiment shown in FIG. 2, and will not be repeated here.

Figure 8:
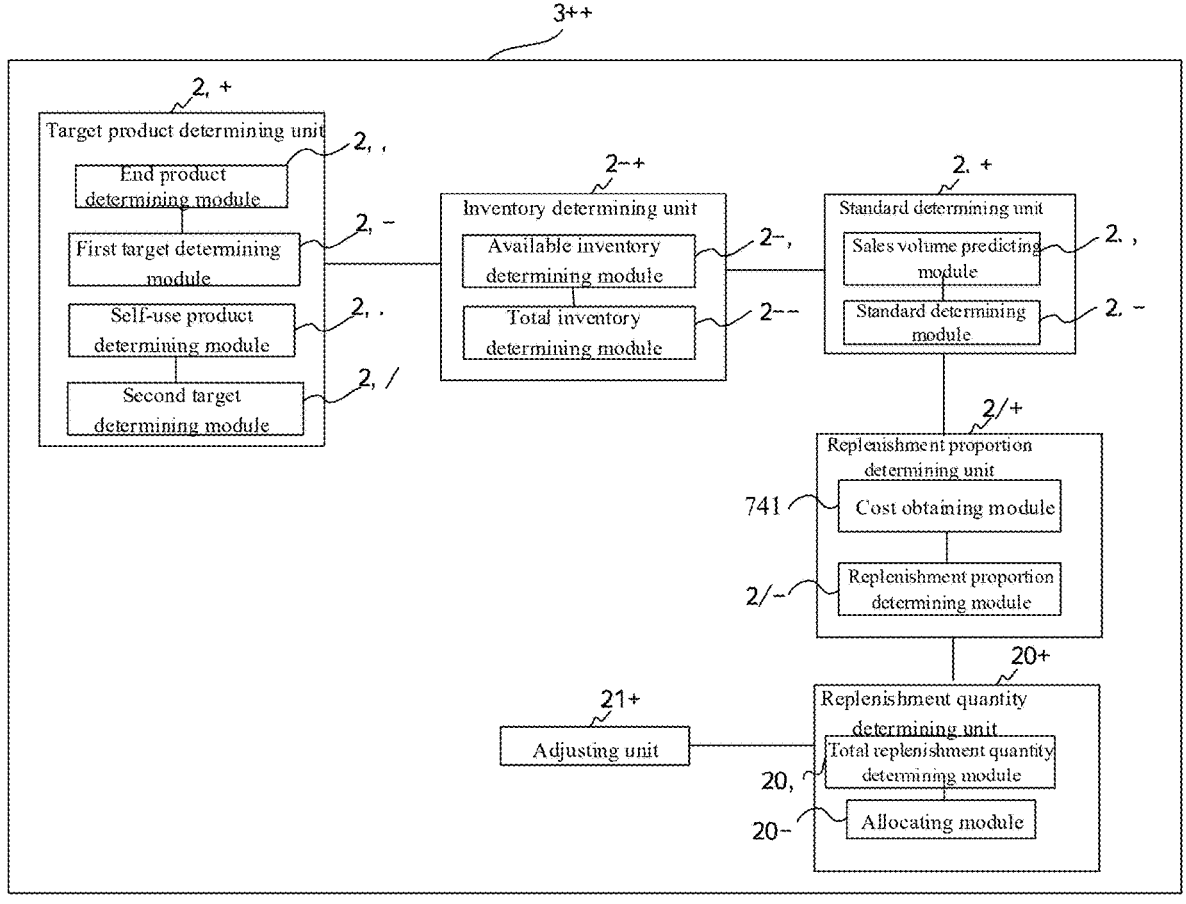
FIG. 8 is a structural diagram of a device for determining the replenishment quantity of the product as shown in another exemplary embodiment of the present disclosure.

FIG. 8 is a structural diagram of a device for determining the replenishment quantity of a product, as shown in another exemplary embodiment of the present disclosure.

As shown in FIG. 8, based on the above embodiment, in the device 800 provided in this embodiment for determining replenishment quantity of a product, the replenishment proportion determining unit 740 includes: a cost obtaining module 741 for obtaining substitution cost between products that can be replaced in both directions; a replenishment proportion determining module 742 configured to determine the replenishment proportions of products with bidirectional inventory usage relationships in the substitution chain based on the substitution cost.

The replenishment proportion determining module 742 is specifically configured to: determine the total substitution cost between products that can be replaced in both directions based on the substitution cost and the random replenishment proportion between products that can be replaced in both directions, each of the random replenishment proportion is greater than or equal to 0, and the sum of the random replenishment proportions for respective products is 1, the random replenishment proportion is randomly set; determine the total substitution cost in the substitution chain based on the total substitution cost between products, and determine the replenishment proportions for products with bidirectional inventory usage relationships in the substitution chain as the random replenishment proportions for products with the lowest total substitution cost of the substitution chain.

If a fixed replenishment proportion of a product is pre-set, the replenishment proportion determining module 742 is specifically configured to set the random replenishment proportion for the products to the fixed replenishment proportion.

The target product determining unit 710 includes: an end product determining module 711 configured to determine end products in the substitution chain based on the product information; a first target determining module 712 configured to determine the target product in the end products based on the inventory information.

Optionally, the target product determining unit 710 includes: a self-use product determining module 713 configured to determine inventory self-use products based on the product information, where the inventory self-use products are not at the end of the substitution chain and the inventory usage forms are only used for this product; a second target determining module 714 configured to determine the target product in the inventory self-use product based on the inventory information.

Optionally, the inventory determining unit 720 includes: an available inventory determining module 721 configured to determine an inventory of a first product as an available inventory if the first product in the substitution chain to which the target product belongs can replace a second product in the substitution chain; a total inventory determining module 722 configured to determine the sum of available inventories corresponding to the substitution chain as the total inventory.

Optional, the available inventory determining module 721 is specifically configured to: determine the sum of the spot inventory and in transit inventory of the first product as the available inventory of the first product.

Optionally, the total inventory is Sn:

$$S_n = \sum_{i=1}^{n} (S_i + O_i) \times L_i$$

Si is spot inventory of product Ai. Oi is in-transit inventory of product Ai. When product Ai can replace any product in the substitution chain, Li=1, otherwise, Li=0.

Optionally, the standard determining unit 730 includes: a sales volume predicting module 731 configured to determine the predicted total sales volume based on the sales volume information of respective products included in the substitution chain; a standard module 732 configured to determine the total target inventory and the inventory lower limit value based on the predicted total sales volume.

Optionally, the standard determining unit 730 is specifically configured to: determine the target inventories corresponding to respective products and the inventory lower limit value of the substitution chain based on the sales volume information of respective products included in the substitution chain.

Optionally, if the inventory usage forms between products in the substitution chain include unidirectional substitution relationships and/or bidirectional inventory usage relationships, the replenishment quantity determining unit 750 includes: a total replenishment quantity determining module 751 configured to determine the total replenishment quantity based on the target inventory and the total inventory; an allocating module 752 configured to multiply the replenishment proportion for each product with a bidirectional inventory usage relationship with the total replenishment quantity, as the replenishment quantity for each product with a bidirectional inventory usage relationship.

Optionally, if the inventory usage forms of respective products in the substitution chain are only for this product, the replenishment quantity determining unit 750 is also configured to: determine the replenishment quantities of respective products included in the substitution chain based on the target inventories and existing inventories corresponding to respective products in the substitution chain.

Optionally, the replenishment quantity determining unit 750 includes: a demand determining module configured to determine the demand quantity corresponding to each product based on the target inventories and existing inventories of respective products; a replenishment quantity determining module configured to determine the sum of the demand quantities corresponding to respective products as the replenishment quantity for the end product in the substitution chain, and to determine the replenishment quantity for other products in the substitution chain as 0.

Optionally, the device provided in this embodiment also includes a adjusting unit 760 configured to obtain procurement information corresponding to respective products in the substitution chain, and adjust the replenishment quantities of respective products based on the procurement information.

The specific principle and implementation method of the device for determining the replenishment quantity of the product provided in this embodiment are similar to the embodiments shown in any one of FIG. 4 to FIG. 7, and will not be repeated here.

Figure 9:
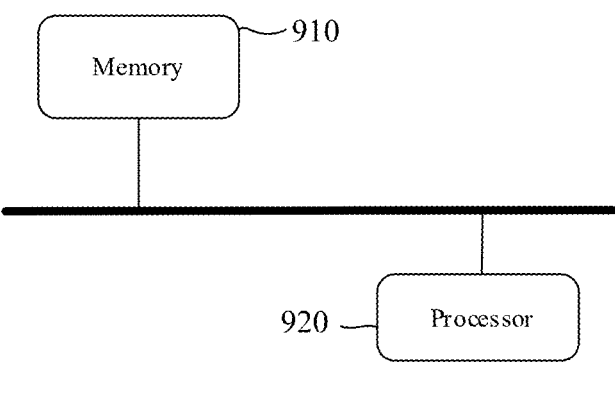
FIG. 9 is a structural diagram of an electronic device shown in an exemplary embodiment of the present disclosure.

FIG. 9 is a structural diagram of an electronic device shown in an exemplary embodiment of the present disclosure.

As shown in FIG. 9, the electronic device 900 provided in this embodiment includes: a memory 910; a processor 920; and computer programs. The computer programs are stored in the memory 910 and configured to be executed by the processor 920 to achieve any method of determining replenishment quantity of a product as described above.

This embodiment also provides a computer-readable storage medium on which computer programs are stored.

The computer programs are executed by the processor to implement any of the methods described above for determining replenishment quantity of the product.

This embodiment also provides a computer program product, including a computer program that, when executed by a processor, implements any of the methods described above for determining the replenishment quantity of the product.

Those skilled in the art can understand that all or part of the steps to implement the above method embodiments can be completed through hardware related to program instructions. The aforementioned program can be stored in a computer readable storage medium. When the program is executed, the steps including the above method embodiments are executed. The aforementioned storage media include various media that can store program code, such as ROM, RAM, magnetic disks, or optical disks.

Finally, it should be noted that the above embodiments are only used to illustrate the technical solution of this disclosure and not to limit it. Although the present disclosure has been described in detail with reference to the aforementioned embodiments, those skilled in the art should understand that they can still modify the technical solutions recorded in the aforementioned embodiments, or equivalently replace some or all of the technical features; and these modifications or replacements do not make the essence of the corresponding technical solutions deviate from the scope of the technical solutions of the various embodiments of this disclosure.

What is claimed is:

1. A method for determining a replenishment quantity of a product, comprising:

obtaining inventory information of a warehouse and product information of products stored in the warehouse, and determining a target product based on the inventory information and the product information;

determining a total inventory based on a substitution chain to which the target product belongs, wherein the substitution chain comprises a plurality of products and relationships between the products; and determining target inventories and an inventory lower limit value based on the product information of the plurality of products comprised in the substitution chain, wherein the total inventory represents a sum of available inventories for respective products comprised in the substitution chain, and the target inventories represent quantities that inventories for respective products in the substitution chain need to reach;

in response to that the total inventory is less than the inventory lower limit value, and inventory usage forms of respective products in the substitution chain comprise bidirectional inventory usage relationships, determining replenishment proportions of products with the bidirectional inventory usage relationships in the substitution chain;

determining the replenishment quantity for each product with the bidirectional inventory usage relationship in the substitute chain based on the replenishment proportions, the target inventories, and the total inventory, wherein determining the replenishment proportions of the products with the bidirectional inventory usage relationships in the substitution chain comprises:

obtaining substitution costs between products with bidirectional substitution relationships;

determining the replenishment proportions of the products with the bidirectional inventory usage relationships in the substitution chain based on the substitution costs, wherein determining the replenishment proportions of the products with the bidirectional inventory usage relationships in the substitution chain based on the substitution costs, comprises:

determining a total substitution cost of the products with the bidirectional substitution relationships based on the substitution costs and random replenishment proportions for the products with the bidirectional substitution relationships; wherein each random replenishment proportion is greater than or equal to 0, and a sum of the random replenishment proportions of respective products is 1; the random replenishment proportions are randomly set;

determining a total substitution cost of the substitution chain based on the total substitution cost between products, and determining the random replenishment proportions for products with lowest total substitution cost of the substitution chain as the replenishment proportions of the products with the bidirectional inventory usage relationships in the substitution chain.

2. The method according to claim 1, wherein determining the target product based on the inventory information and the product information comprises:

determining one or more end products in the substitute chain based on the product information;

determining the target product among the end products based on the inventory information.

3. The method according to claim 1, wherein determining the target product based on the inventory information and the product information comprises:

determining inventory self-use products based on the product information, wherein the inventory self-use products are non-end products in the substitute chain and the inventory usage forms of the inventory self-use products are only for themselves;

determining the target product among the inventory self-use products based on the inventory information.

4. The method according to claim 1, wherein determining the total inventory based on the substitution chain to which the target product belongs comprises:

in response to that a first product in the substitution chain to which the target product belongs is capable of replacing a second product in the substitution chain, determining an inventory of the first product as available inventory;

determining a sum of respective available inventories corresponding to the substitute chain as the total inventory.

5. The method according to claim 4, wherein determining the inventory of the first product as the available inventory comprises:

determining a sum of a spot inventory and an in-transit inventory of the first product as the available inventory of the first product.

6. The method according to claim 5, wherein the total inventory is Sn;

$$S_n = \sum_{i=1}^{n} (S_i + O_i) \times L_i$$

wherein Si is the spot inventory of product Ai, Oi is the in-transit inventory of the product Ai, and when the product Ai is capable of replacing any product on the substitute chain, Li=1, otherwise, Li=0.

7. The method according to claim 1, wherein determining the target inventories and the inventory lower limit value based on the product information of the plurality of products comprised in the substitution chain comprises:

determining a predicted total sales volume based on sales volume information of respective products comprised in the substitution chain;

determining a total target inventory and the inventory lower limit value based on the predicted total sales volume.

8. The method according to claim 1, wherein determining the target inventories and the inventory lower limit value based on the product information of the plurality of products comprised in the substitution chain comprises:

determining the target inventories corresponding to respective products and the inventory lower limit value of the substitution chain based on sales volume information of respective products comprised in the substitution chain.

9. The method according to claim 1, wherein determining the replenishment quantity for each product with the bidirectional inventory usage relationship in the substitute chain based on the replenishment proportions, the target inventories, and the total inventory comprises:

determining a total replenishment quantity based on the total inventory and the target inventory;

determining a product of the replenishment proportion for each product with the bidirectional inventory usage relationship and the total replenishment quantity as the replenishment quantity for each product with the bidirectional inventory usage relationship.

10. The method according to claim 1, wherein the inventory usage forms for respective products in the substitution chain are only for themselves, and the total inventory is less than the inventory lower limit value, the method further comprises:

determining the replenishment quantities for respective products comprised in the substitution chain based on the target inventories and existing inventories corresponding to respective products in the substitution chain.

11. The method according to claim 10, wherein determining the replenishment quantities for respective products comprised in the substitution chain based on the target inventories and existing inventories corresponding to respective products comprises:

determining a demand quantity corresponding to each product based on the target inventories and the existing inventories for respective products;

determining the replenishment quantity for an end product in the substitute chain as a sum of the demand quantities corresponding to respective products, and determining the replenishment quantities for other products in the substitute chain as 0.

12. The method according to claim 1, further comprising:

obtaining procurement information corresponding to respective products in the substitution chain, and adjusting the replenishment quantities for respective products based on the procurement information.

13. An electronic device, comprising:

a memory;

a processor; and computer programs;

wherein, the computer programs are stored in the memory and configured to be executed by the processor to cause the processor to:

obtain inventory information of a warehouse and product information of products stored in the warehouse, and determine a target product based on the inventory information and the product information;

determine a total inventory based on a substitution chain to which the target product belongs, wherein the substitution chain comprises a plurality of products and relationships between the products; and determine target inventories and an inventory lower limit value based on the product information of the plurality of products comprised in the substitution chain, wherein the total inventory represents a sum of available inventories for respective products comprised in the substitution chain, and the target inventories represent quantities that inventories for respective products in the substitution chain need to reach;

in response to that the total inventory is less than the inventory lower limit value, and inventory usage forms of respective products in the substitution chain comprise bidirectional inventory usage relationships, determine replenishment proportions of products with the bidirectional inventory usage relationships in the substitution chain;

determine the replenishment quantity for each product with the bidirectional inventory usage relationship in the substitute chain based on the replenishment proportions, the target inventories, and the total inventory, wherein determining the replenishment proportions of the products with the bidirectional inventory usage relationships in the substitution chain comprises:

obtaining substitution costs between products with bidirectional substitution relationships;

determining the replenishment proportions of the products with the bidirectional inventory usage relationships in the substitution chain based on the substitution costs, wherein determining the replenishment proportions of the products with the bidirectional inventory usage relationships in the substitution chain based on the substitution costs, comprises:

determining a total substitution cost of the products with the bidirectional substitution relationships based on the substitution costs and random replenishment proportions for the products with the bidirectional substitution relationships; wherein each random replenishment proportion is greater than or equal to 0, and a sum of the random replenishment proportions of respective products is 1; the random replenishment proportions are randomly set;

determining a total substitution cost of the substitution chain based on the total substitution cost between products, and determining the random replenishment proportions for products with lowest total substitution cost of the substitution chain as the replenishment proportions of the products with the bidirectional inventory usage relationships in the substitution chain.

14. A non-transitory computer-readable storage medium, wherein computer programs are stored on the computer-readable storage medium, and the computer programs are executed by a processor to cause the processor to:

obtain inventory information of a warehouse and product information of products stored in the warehouse, and determine a target product based on the inventory information and the product information;

determine a total inventory based on a substitution chain to which the target product belongs, wherein the substitution chain comprises a plurality of products and relationships between the products; and determine target inventories and an inventory lower limit value based on the product information of the plurality of products comprised in the substitution chain, wherein the total inventory represents a sum of available inventories for respective products comprised in the substitution chain, and the target inventories represent quantities that inventories for respective products in the substitution chain need to reach;

in response to that the total inventory is less than the inventory lower limit value, and inventory usage forms of respective products in the substitution chain comprise bidirectional inventory usage relationships, determine replenishment proportions of products with the bidirectional inventory usage relationships in the substitution chain;

determine the replenishment quantity for each product with the bidirectional inventory usage relationship in the substitute chain based on the replenishment proportions, the target inventories, and the total inventory, wherein determining the replenishment proportions of the products with the bidirectional inventory usage relationships in the substitution chain comprises:

obtaining substitution costs between products with bidirectional substitution relationships;

determining the replenishment proportions of the products with the bidirectional inventory usage relationships in the substitution chain based on the substitution costs, wherein determining the replenishment proportions of the products with the bidirectional inventory usage relationships in the substitution chain based on the substitution costs, comprises:

determining a total substitution cost of the products with the bidirectional substitution relationships based on the substitution costs and random replenishment proportions for the products with the bidirectional substitution relationships; wherein each random replenishment proportion is greater than or equal to 0, and a sum of the random replenishment proportions of respective products is 1; the random replenishment proportions are randomly set;

determining a total substitution cost of the substitution chain based on the total substitution cost between products, and determining the random replenishment proportions for products with lowest total substitution cost of the substitution chain as the replenishment proportions of the products with the bidirectional inventory usage relationships in the substitution chain.

\* \* \* \* \*